April 25, 1961
D. D. CUNEFARE
2,981,222
STEERING DEVICE FOR OUTBOARD MOTOR
Filed Jan. 14, 1958
3 Sheets-Sheet 1
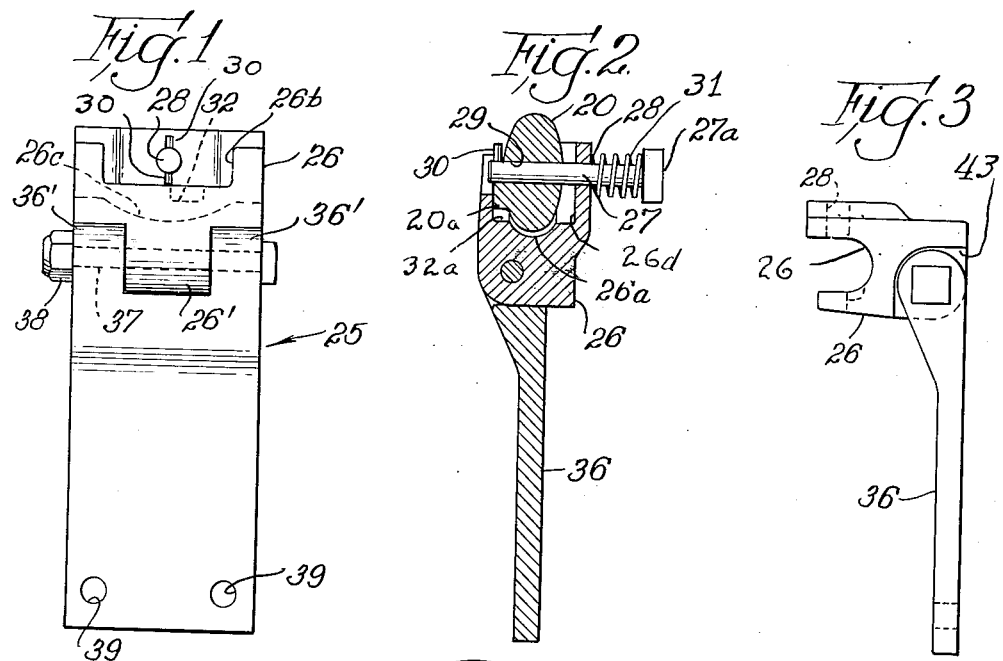
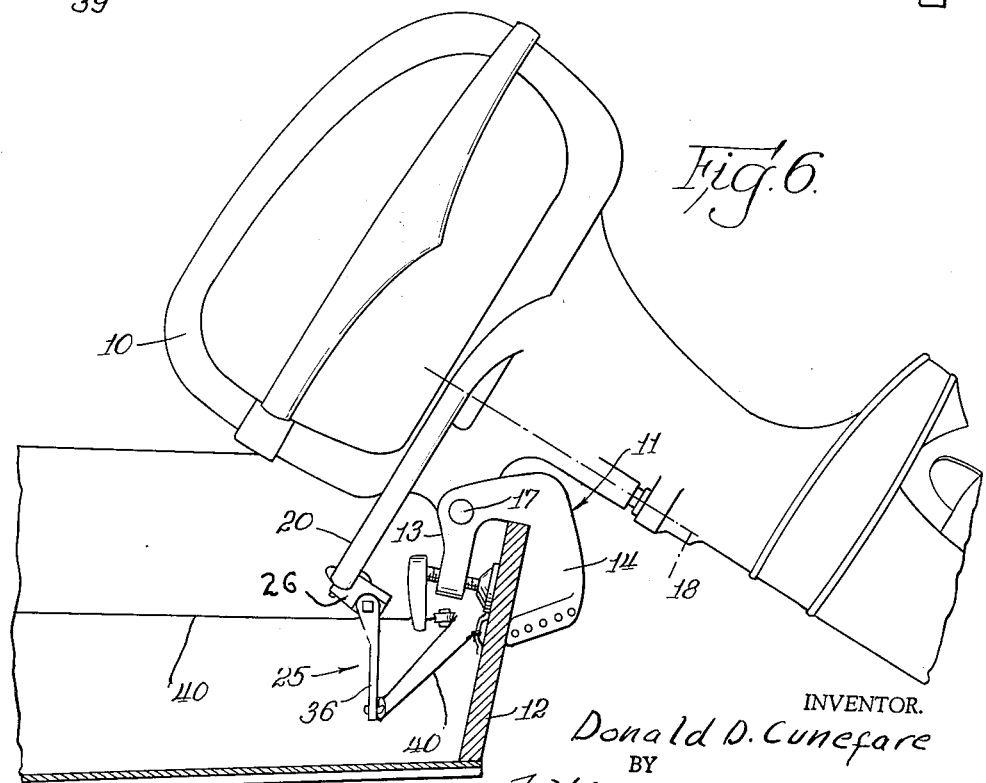
INVENTOR.
Donald D. Cunefare
BY
Fidler, Crowe & Beardsley
Att'ys.

INVENTOR.
Donald D. Cunefare

April 25, 1961  D. D. CUNEFARE  2,981,222
STEERING DEVICE FOR OUTBOARD MOTOR
Filed Jan. 14, 1958  3 Sheets-Sheet 3

INVENTOR.
Donald D. Cunefare
BY
Fidler, Crouse & Beardsley
Att'ys.

United States Patent Office 2,981,222
Patented Apr. 25, 1961

2,981,222
STEERING DEVICE FOR OUTBOARD MOTOR
Donald Dick Cunefare, 120 S. Edgewood Ave., Lombard, Ill.
Filed Jan. 14, 1958, Ser. No. 708,858
16 Claims. (Cl. 115—18)

This invention relates to a steering device for outboard motors and it has to do more particularly with a novel bracket for attachment to a steering member such as a steering arm. It is an object of the invention to provide an improved article of this character.

Outboard motors are commonly provided with a U-shaped steering arm extending inboard when the motor is clamped to the transom of a boat. The boat may be steered, if desired, by manual manipulation of a steering arm or by a tiller bar. However, a common arrangement employs a remote control including a steering cable which extends from a steering wheel located forwardly in the boat, over pulleys secured to the gunwales, rearwardly along the gunwales, over second pulleys near the stern of the boat and to the steering arm. The wheel and steering cable are associated in such a way that turning of the steering wheel in one direction draws on the cable at one side of the boat and releases the cable at the other side such that the steering bracket is pulled laterally and the main portion of the outboard motor is turned about a vertical pivot axis. Conventionally, in such an arrangement the steering cable is secured substantially directly to the steering arm. It is furthermore conventional that the steering arm be arranged fairly high on the outboard motor. Accordingly, the steering cable necessarily slopes upwardly from the rear pulleys to the steering arm. This arrangement has several disadvantages. Among these are the fact that unless the after deck is substantially cut away there may be interference between the deck and the steering cable, particularly when the motor is turned sharply in either direction. Another disadvantage is that the total required length of the cable is substantially altered when the motor is turned from central or dead-ahead position to a sharp turning position and when the motor is pivoted from an outboard position to an inboard position. Long cable springs are therefore required if excessive cable slack and cable fouling are to be avoided. Still another disadvantage is that reduced leverage necessarily follows from the fact that the cable slopes substantially with respect to the horizontal.

A steering bracket constructed in accordance with the present invention and applied to an outboard motor in such an application eliminates or materially reduces all of these disadvantages of the conventional steering arrangement. More particularly, it eliminates any possible interference between the steering cable and the rear deck. It also increases cable leverage and minimizes the change in required cable length inherent in conventional arrangements. Furthermore, the steering bracket of the present invention accomplishes these things without interfering in any way with the pivoting of the main portion of the outboard motor between an outboard position and an inboard position. This pivoting movement of the motor is desirable as it permits withdrawal of the propeller from the water when desired, as for example, when the boat is being beached. It is a feature incorporated in many installations.

Accordingly, it is another object of the invention to provide an improved steering bracket for an outboard motor which permits the steering cable to be arranged completely or substantially below the after-deck of a boat with which the steering bracket and a conventional outboard motor are employed.

It is still another object to provide an improved steering bracket for an outboard motor which minimizes the change in required steering cable length and increases the leverage of the steering cable as employed with a conventional outboard motor.

It is a further object to provide an improved steering bracket for an outboard motor having various of the advantages specified above while providing no interference with the pivoting of the outboard motor between an outboard position and an inboard position.

Another object is to provide a steering bracket for an outboard motor which is adapted to be attached to a steering arm by a locking pin wherein the pin is permanently connected to the bracket and therefore not subject to loss or misplacement.

Another object is to provide a steering bracket of the character described which is so constructed that it does not interfere with the means for mounting and securing the motor in the boat or the tilt release lock.

A further object is to provide a steering bracket for an outboard motor which can be quickly and easily attached to or removed from the steering arm of an outboard motor.

It is a still further object to provide an improved steering bracket for an outboard motor having various of the characteristics described above which is efficient, sturdy, reliable, simple in construction and economical to manufacture.

This invention, together with further objects and advantages thereof, will best be understood by reference to the following description taken in connection with the accompanying drawings, and its scope will be pointed out in the appended claims.

In the drawings, in which like parts are designated by like reference numerals:

Figure 1 is a front elevational view of a steering bracket illustrating a preferred embodiment of the invention and showing a locking pin assembled with the bracket;

Fig. 2 is a vertical cross section of the same steering bracket of Fig. 1 taken medially through Fig. 1 and showing the bracket secured to the steering arm of an outboard motor;

Fig. 3 is a side elevation of the steering bracket of Fig. 1 showing it in the position it assumes when pivoted to the limit of its movement;

Fig. 6 is a view similar to Fig. 5 but showing the motor pivoted to its inboard position;

Figure 4:
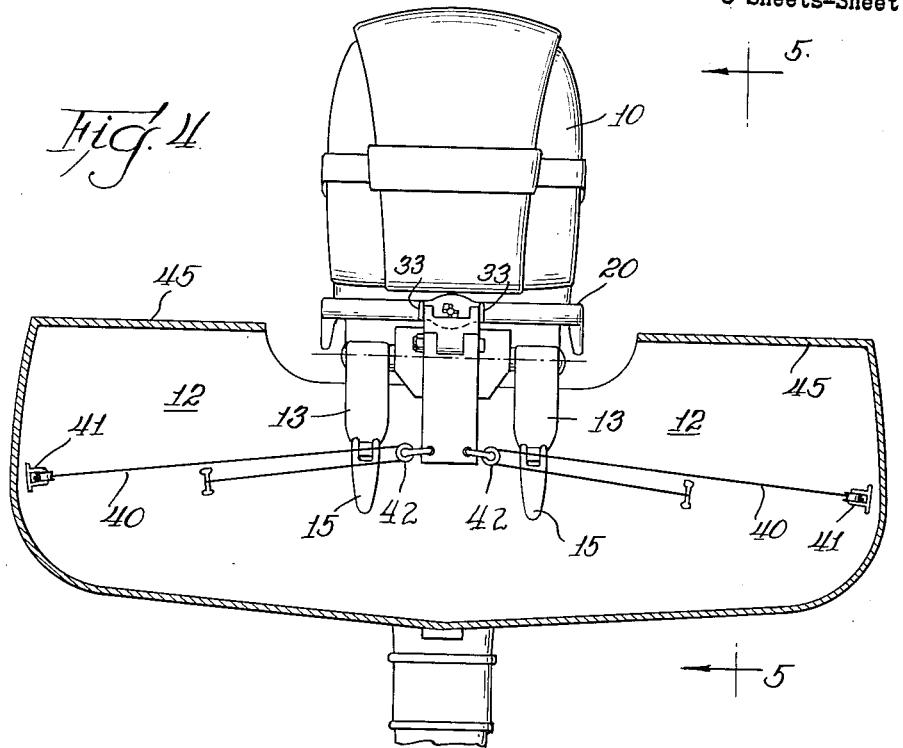
Fig. 4 is a transverse sectional view through the rear portion of a boat showing the steering cable, an outboard motor, and steering bracket of Figs. 1–3, the motor and steering bracket being shown in front elevation.

In the embodiments of the invention illustrated in the drawings the steering bracket which constitutes the present invention is especially well adapted for cooperation with certain popular types of outboard motors having a U-shaped steering arm. Where the steering bracket constituting the present invention is to be employed with other types of outboard motors various modifications may be made to adapt the bracket for such use, without departure from the spirit of the invention.

Figure 5:
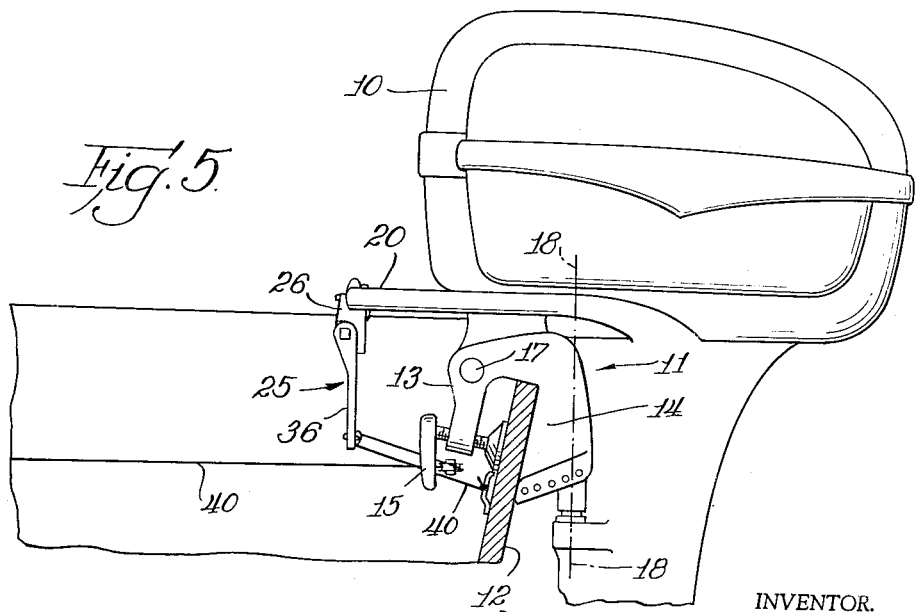
Fig. 5 is a fragmentary cross-sectional view taken along the line 5—5 of Fig. 4, and showing the motor and steering bracket in side elevation.

An outboard motor 10 of customary form is shown in Figures 4, 5 and 6 which includes a mounting structure 11 for securing the motor to the transom 12 of a boat. The structure 11 includes legs 13 and 14 extending downwardly over the inside and outside of the transom 12, respectively, and carrying suitable clamps 15 for securing the structure 11 to the transom 12.

The outboard motor proper is pivoted with respect to the mounting structure 11 about an axis 17, whereby it may pivot between an outboard position, as illustrated in Fig. 5, and an inboard position, as illustrated in Fig. 6. The motor proper is also pivotable, of course, about a vertical axis (identified as 18) such that the direction of movement of the boat with which it is employed may be controlled. Since all of the elements above referred to and characteristics of the outboard motor 10 are common in the art, and since they do not of themselves constitute a feature of the present invention, they are not described in detail herein.

A U-shaped steering arm 20 of a common form is secured to the motor proper and pivots with the motor about the vertical axis 18 and also about the horizontal axis 17. It will be seen from Fig. 6 that when the motor is pivoted to its inboard position the steering arm 20 is spaced substantially from the transom 12 and from the clamping legs and clamps and therefore there is no interference with the movement of the motor or the action of the steering bracket.

Figure 7:
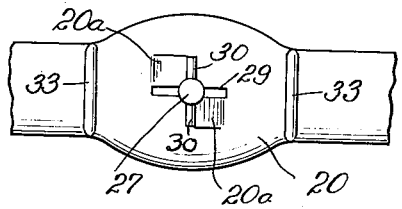
Fig. 7 is an enlarged fragmentary view of a detail.

The preferred form of steering bracket in accordance with the present invention is shown in detail in Figs. 1–3. The steering bracket 25 includes a clamping member 26 which is releasably securable to the steering arm 20 in a manner best seen in Figure 2. The clamping member 26 has a U-shaped recess 26a for receiving the steering arm 20. A locking pin 27 is provided for securing the clamping member to the steering arm. The pin 27 extends through an opening 28 in the rear wall portion of the clamping member 26 and through an aligned opening 29 in the steering arm 20. The locking pin 27 has a fixed retaining pin extending transversely therethrough adjacent the forward end and providing, in effect, lugs 30 projecting on opposite sides of the locking pin. The opening 29 through the steering bracket 20 is shaped as a key slot, as seen in Fig. 7, so that the retaining pin 30 may pass through this opening and, after the pin 27 is in place, with the retaining pin 30 lying immediately forward of the steering arm 20, the pin 27 may be turned to a 90° position so that the retaining pin 30 prevents accidental withdrawal of the locking pin 27 from the steering arm.

The locking pin 27 is formed with a head 27a at its after end (as shown in Fig. 2) and a coil spring 31 is compressed between the head 27a and the rear surface of the clamping member 26 to hold the pin securely in place.

In the particular form of the clamping member 26 illustrated in the drawings the clamping member has a U-shaped recess 26a, as stated above, for receiving the steering arm 20, and the forward wall portion of the clamping member is notched as at 26b to accommodate the forward end of the locking pin 27 and the retaining pin 30 carried thereby.

The notch 26b also accommodates the upper one of a pair of stop lugs 20a (Figs. 2 and 7) which customarily are provided on the steering arm 20 and which project rearwardly therefrom and jointly serve as a stop to insure that the projecting lugs 30 of the locking pin 27 are positioned vertically when the locking pin has been passed through the steering arm and turned to retain the locking pin in bracket-retaining position. The clamping member 26 is provided with a small notch or recess 32 to accommodate at least a portion of the lower one of the stop lugs 20a.

The locking pin 27 of this invention as well as the associated retaining pin and the spring are similar to those in common use for securing remote control cable brackets to steering arms and are adapted to cooperate with a steering arm of common form having a key slot and stop lugs as described. However, according to the preferred form of my invention the locking pin 27 and associated members are permanently retained in the bracket and more particularly in the clamping member 26. Accordingly, the locking pin 27 is assembled with the clamping member 26 by passing it through the opening 28 before the retaining pin 30 is assembled with the pin 26. Thereafter, the retaining pin 30 is driven through a transverse bore (not shown) near the end of the locking pin 27. Thus the locking pin and its associated members are made unitary with the steering bracket and cannot become separated therefrom and misplaced.

Figure 8:
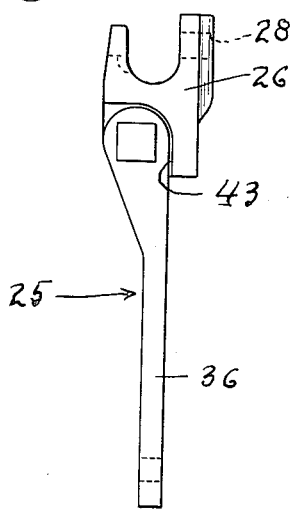
Fig. 8 is a side elevational view of the bracket in the position it assumes when the motor is in inboard position.

In order to accommodate the rearward movement of the locking pin 27 sufficient to permit insertion of the steering arm 20 in the recess 26a of the clamping member 26, the latter is provided with a recess 26d which is formed by offsetting a portion of the rear wall of the clamping member 26, as shown particularly in Figs. 2, 3, and 8.

Frequently, the steering arm of commercial outboard motors will have a small bulge at the center. The U-shaped recess 26a of the clamping member 26 is accordingly dished downwardly, as may be seen at 26c in Fig. 1. Steering arms commonly have a pair of beads 33 (Figs. 4 and 7) at opposite sides of center as shown in Fig. 4. The clamping member 26 is preferably made of such width that it fits neatly between these beads.

An arm member 36 is pivotally connected to the clamping member 26 by a pintle which may take the form of a bolt 37, passing through hinge knuckles 36′ and 26′ integral with the members 36 and 26 respectively. The bolt 37 is headed at one end and has a lock nut 38 at its other end. The arm member 36 has a pair of openings 39 adjacent its lower or free end to facilitate connection of steering cable 40 thereto.

Where increased leverage is desired, the cable may be secured to the arm member 36 through pulleys 42 (Fig. 4) and the free ends of the cable anchored on the transom, all as shown in Fig. 4. The steering cable 40 rides over other pulleys 41 and extends forwardly along the gunwales (Fig. 6), over still another pair of pulleys (not shown) and finally to the wheel shaft (not shown). Since this construction does not constitute a feature of the present invention and may be conventional in form, it is not shown further in the drawings or further described herein.

The pulleys 41 are conventionally and preferably located near the juncture of the transom and the gunwales in order to permit maximum use of the interior of the boat. As is indicated in Figure 5, this places the pulleys 41 somewhat to the rear of the steering bracket 25 and of the forward portion of the steering arm 20. Accordingly, tension on the steering cable 40 tends to swing the steering bracket 25, and in particular, the arm member 36 thereof, rearwardly. In order to avoid possible interference between the steering cable 40 and the clamps 15, the arm member 36 of the steering arm 25 is prevented from pivoting rearwardly or toward the transom 12 beyond a substantially vertical position when the outboard motor is in its outboard position. In the illustrative embodiment of the invention undesired rearward pivotal movement of the arm member 36 is prevented by the construction of the knuckles 36′ and 26′. More particularly, and as may be seen in Fig. 2, the bottom wall of the opening in the arm member 36 between the knuckles 36a is made flat and strikes the rear portion of the knuckle 26' to prevent rearward movement of the arm member 36 beyond a substantially vertical position when the motor is in its outboard position, as illustrated in Fig. 2. Furthermore, the main body of the clamping member 26 extends downwardly to the rear of the knuckles 36' to provide a stop surface 43 (Fig. 8) and the arm 26 has a flat after surface adapted to abut thereagainst which also prevents rearward pivotal movement of the arm member 36 beyond a substantially vertical position.

Referring again to Figures 4 and 5, it will be seen that the steering bracket 25 maintains the steering cable 40 a sufficient distance forwardly of the transom 12 so that it will not engage the clamping members 15 or any other protruding part of the outboard motor 10. Furthermore, the slope of the steering cable 40 as it extends across the stern of the boat is reduced as compared to an installation in which the steering cable is brought from the pulleys 41 up to the steering arm 20 of the outboard motor. Accordingly, as the outboard motor is pivoted by the steering cable to steer the boat, there is very little change in the required overall length of the steering cable. Furthermore, much better leverage is provided in the steering of the boat. Still further, the steering cable 40 lies entirely below the after-deck 45 whereby the latter need be cut out only to the extent required to permit movement of the outboard motor to its inboard position. More particularly, it need not be cut away additionally to prevent interference with the steering cable 40.

When the outboard motor is swung to its inboard position, illustrated in Fig. 6, the steering arm 20 necessarily pivots primarily downwardly and somewhat rearwardly. If a rigid one-piece steering arm were provided, the lower end would strike the transom and prevent full movement of the outboard motor to its inboard position. However, with the hinged steering bracket 25 of the present invention, full inboard pivoting of the outboard motor is permitted. Furthermore, such movement of the outboard motor may be accomplished without substantial stretching or slacking of the steering cable. It will be apparent that if the steering cable 40 were connected to the steering arm 20, pivoting of the outboard motor to its inboard position would result in a very substantial slacking of the steering cable. Accordingly there would be danger of fouling the steering cable unless the springs which are conventionally employed in the steering cable were of sufficient flexibility that they would take up this very considerable slack. Where the steering bracket 25 of the present invention is employed, there is a much smaller change in required total length of the steering cable as the motor is swung to its inboard position. The lower end of the arm member 36, to which the steering cable 40 is attached lies much more nearly in the plane of the pulleys 42 than does the steering arm 20. Furthermore, the total effective length of the steering bracket 25 is reduced as the motor is swung to its inboard position, since the clamping member 26 extends vertically when the motor is in its outboard position and extends substantially horizontally when the motor is in its inboard position, all as may be seen by reference to Figures 5 and 6. The change in required total length of the cable can be reduced to insignificant value if the pulleys 41 are positioned at such height that the lower end of the arm member 36 lies above and below the pulleys when the motor is in its outboard and inboard positions respectively.

Figure 9:
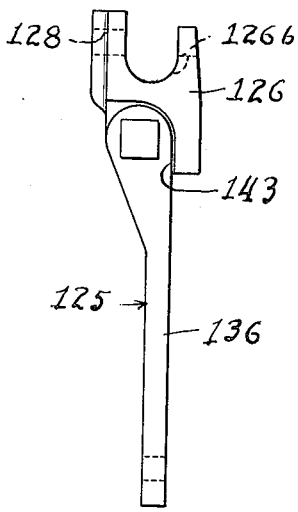
Fig. 9 is a view similar to Fig. 8 only showing a form of bracket according to the invention which is adapted to receive a locking pin projected therethrough in a fore to aft direction.

The bracket 25 of Figs. 1 to 3 and 8 is formed to receive a locking pin which is inserted through the steering arm from the after side, that is from the side of the arm nearer to the motor. In the case of some motors, however, and especially those where there is a small amount of space between the transverse portion of the steering arm and the motor, the locking pin is inserted from the forward side of the arm, and the arm is formed with the retaining lugs on the after side thereof. In order that the bracket of the present invention may be used with the latter form of arms, I provide a bracket 125 of modified form, such as shown in Fig. 9.

The bracket 125 is generally similar to the bracket 25. However, as will be seen from a comparison of Fig. 9 with Fig. 8 (in which figures the bracket 25 is shown in normal operating position), the clamping member 126 is formed with the wall portion having the notch 126b on the same side (after side) as the stop surface 139, and the wall portion having the opening 128 for the locking pin (not shown in Fig. 9) on the forward side. The operation of this form of bracket is similar to that of the first described form except that the locking pin is inserted in the steering arm in a fore to aft direction.

Figure 10:
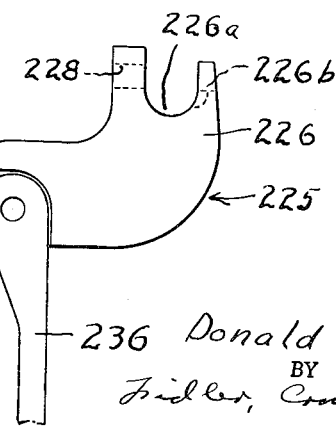
Fig. 10 is a side elevational view of a further modification.

Certain outboard motors are provided with a tilt lock for holding the motor in inboard position, which lock projects forwardly below the steering arm. In order to prevent interference between such lock and the depending arm member of my bracket, I provide a modification of my bracket which is illustrated in Fig. 10.

The bracket 225 includes a clamping member 226 which is generally similar to the member 126, except as will be explained hereinafter. Thus the clamping member 226 has a U-shaped recess 226a for receiving the steering bracket, an opening 228 in one of the upstanding wall portions and a notch 226b in the other. It also has hinge knuckles 226' for cooperation with hinge knuckles 236' on an arm 236, which latter may be identical with the arm 136 and pivotally connected to the clamping member 226.

The clamping member 226 differs from the member 126 principally in that it extends first downwardly from the upper portion having the recess 226a and then forwardly a substantial distance. Thus the knuckle 226' and consequently the arm 236 is displaced or offset forwardly from the recess 226a and such elements are not substantially in vertical alignment, as in the case of the previously described embodiments. It will be noted that the clamping member 226 is considerably thicker than the clamping members of the other embodiments and thus insuring sufficient strength to resist the downward bending force exterted thereon when in use.

A steering bracket has now been disclosed for use with an outboard motor, and particularly with one which is pivotable between an outboard position and an inboard position. This steering bracket prevents interference between the steering cable and the after-deck, whereby the after-deck may be cut out only enough to permit steering movements of the motor and movement in an inboard position. It also provides better leverage for the steering cable. It minimizes alteration of the total length of cable as the motor is turned to alter the course of the boat with which it is employed. Still further, it greatly reduces alteration of the total length of cable when the outboard motor is pivoted between its outboard and inboard positions. Finally, it accomplishes all these things without interference with the pivoting of the motor between its outboard and inboard positions.

I claim:

1. In combination, a boat having a transom, an outboard motor having a drive portion, supporting means releasably securable to said transom, means pivotally mounting said drive portion on said supporting means for movement of said drive portion between an inboard position and an outboard position, and a steering arm secured to said drive portion and arranged to lie inboard of said transom, and a steering bracket including a clamping member having means for releasably securing it to said steering arm, an arm member, and means pivotally connecting one end of said arm member to said clamping member, whereby said arm member may hang downwardly when said drive portion of said outboard motor is in either its inboard or outboard position, said connecting means restraining said arm member from pivotal movement toward said transom beyond a substantially vertical position when said drive portion of said outboard motor is in its outboard position and restraining said arm member from lateral displacement relatively to said clamping member in all positions of said arm member, the other end of said arm member having means at a fixed distance from said pivot means for connecting a steering cable to said arm member.

2. The steering bracket as set forth in claim 1 in which said last-named means includes an opening in said arm member adjacent said other end.

3. In combination, a boat having a transom, an outboard motor having a drive portion, supporting means releasably securable to said transom, means pivotally mounting said drive portion on said supporting means for movement of said drive portion between an inboard position and an outboard position, and a steering arm secured to said drive portion and arranged to lie inboard of said transom, and a steering bracket including a clamping member having means for releasably securing it to said steering arm, said clamping member having a U-shaped recess for receiving said steering arm, an arm member and means including hinge knuckles on said members pivotally connecting one end of said arm member to said clamping member whereby said arm member may hange downwardly when said drive portion of said outboard motor is in either its inboard or outboard position, said means restraining said arm member from pivotal movement toward said transom beyond a substantially vertical position when said drive portion of said outboard motor is in its outboard position, the other end of said arm member having means at a fixed distance from said pivot means for connecting a steering cable to said arm member.

4. The steering bracket as set forth in claim 3 wherein said hinge knuckles are formed in the opposite portion of said clamping member from, and substantially in alignment with said U-shaped recess.

5. The steering bracket as set forth in claim 3 wherein said hinge knuckles are formed in a portion of said clamping member offset longitudinally and laterally from said U-shaped recess.

6. The steering bracket as set forth in claim 3 wherein the wall portion on one side of said U-shaped recess is formed with a bore therethrough and the wall portion on the other side of said recess is formed with a notch aligned with said bore.

7. In combination, a boat having a transom, an outboard motor having a drive portion, supporting means releasably securable to said transom, means pivotally mounting said drive portion on said supporting means for movement of said drive portions between an inboard position and an outboard position, and a steering arm secured to said drive portion and arranged to lie inboard of said transom, and a steering bracket including a clamping member having an edge formed to receive the steering arm and means for releasably securing it to said steering arm in position to extend downwardly therefrom, an arm member and means pivotally connecting one end of said arm member to said clamping member whereby said arm member may hang downwardly when said drive portion of said outboard motor is in either its inboard or outboard position, said means restraining said arm member from pivotal movement toward said transom beyond a substantially vertical position when said drive portion of said outboard motor is in its outboard position and restraining said arm member against lateral displacement relatively to said clamping member in all positions of said arm member, the other end of said arm member having means at a fixed distance from said pivot means for connecting a steering cable to said arm member.

8. In combination, a boat having a transom, an outboard motor having a drive portion, supporting means releasably securable to said transom, means pivotally mounting said drive portion on said supporting means for movement of said drive portions between an inboard position and an outboard position, and a steering arm secured to said drive portion and arranged to lie inboard of said transom, and a steering bracket including a clamping member having means for releasably securing it to said steering arm in position to extend downwardly therefrom, a generally rectangular plate-like arm member, and means pivotally connecting said arm member to said clamping member substantially along one short edge of said arm member whereby said arm member may hang downwardly when said drive portion of said outboard motor is in either its inboard or outboard position, said means restraining said arm member from pivotal movement toward said transom beyond a substantially vertical position when said drive portion of said outboard motor is in its outboard position, the other end of said arm member being formed with laterally spaced openings for connecting a steering cable to said arm member.

9. In combination, a boat having a transom, an outboard motor having a drive portion, supporting means releasably securable to said transom, means pivotally mounting said drive portion on said supporting means for movement of said drive portion between an inboard position and an outboard position, and a steering arm secured to said drive portion and arranged to lie inboard of said transom, and a steering assembly including a clamping member releasably securable to said steering arm, said clamping member having a U-shaped recess for receiving said steering arm, the wall portion on one side of said U-shaped recess having an opening therethrough, and means including hinge knuckles on said members pivotally connecting one end of said arm member to said clamping member whereby said arm member may hang downwardly when said drive portion of said outboard motor is in either its inboard or outboard position, said means restraining said arm member from pivotal movement toward said transom beyond a substantially vertical position when said drive portion of said outboard motor is in its outboard position, the other end of said arm member having means at a fixed distance from said pivot means for connecting a steering cable to said arm member, and a locking pin extending through said opening and having a head on one end and a pair of diametrically opposed retaining lugs adjacent the other end, both said head and the diametral extent of said lugs being greater than the diameter of said opening whereby said locking pin is retained in said clamping portion.

10. In combination, a boat having a transom, an outboard motor having a drive portion, supporting means releasably securable to said transom, means pivotally mounting said drive portion on said supporting means for movement of said drive portion between an inboard position and an outboard position, and a steering arm secured to said drive portion and arranged to lie inboard of said transom, and a steering bracket including a clamping member releasably securable to said steering arm, said clamping member having a U-shaped recess extending along one edge for receiving said steering arm, the wall portion on one side of said recess having a bore to receive a locking pin therethrough and the wall portion on the other side of the U-shaped recess being provided with a notch opposite said bore, an arm member, and means pivotally connecting one end of said arm member to said clamping member, whereby said arm member may hang downwardly when said drive portion of said outboard motor is in either its inboard or outboard position, and stop means on one side of the pivot axis of said connecting means restraining said arm member from pivotal movement toward said transom beyond a substantially vertical position when said drive portion of said outboard motor is in its outboard position, the other end of said arm member having means at a fixed distance from said pivot means for connecting a steering cable to said arm member.

11. The steering bracket as set forth in claim 10 wherein the bore is formed in the wall portion on the same side of the clamping member as said stop means.

12. The steering bracket as set forth in claim 10 wherein the notch is formed in the wall portion on the same side of the clamping member as the stop means.

13. A steering bracket for attachment to the steering arm of an outboard motor, said bracket comprising a clamping member having an open, trough-shaped recess extending from side to side thereof for receiving a steering arm, an arm member, and means pivotally connecting said arm member at one end to said clamping member on the opposite side from said recess whereby said clamping member is positioned with said recess opening upwardly, said arm member depends vertically from said clamping member, and is swingable in a vertical plane, said clamping member and said arm member having mutually engaging stop means for halting the pivotal movement of said arm member in one direction at a substantially vertical position when said clamping member is positioned with said recess opening upwardly and said arm having means at a fixed distance from said pivot means for attaching a remote control steering cable thereto.

14. A steering bracket as set forth in claim 13 wherein said arm is of rectangular, generally plate-like form and said last-named means includes openings extending through said arm at the end remote from said pivot means.

15. A steering bracket as set forth in claim 13 wherein a slotted opening is provided in one wall of said recess and a notch is provided in the opposite wall extending to a location below said slotted opening.

16. A steering bracket as set forth in claim 13 wherein a slotted opening is provided in one wall of said recess, a notch is provided in the opposite wall extending to a location below said slotted opening and recess is provided in the inner face of said last-named wall at a location closely adjacent but offset from alignment with said slotted opening.

References Cited in the file of this patent

UNITED STATES PATENTS

| | | |
|---|---|---|
| 1,314,995 | Whigam et al. | Sept. 2, 1919 |
| 1,459,734 | Johnson | June 26, 1923 |
| 1,687,783 | Oughton | Oct. 16, 1928 |
| 2,237,834 | Landgraf | Apr. 8, 1941 |
| 2,256,831 | Karey | Sept. 23, 1941 |
| 2,478,858 | Buske | Aug. 9, 1949 |
| 2,615,418 | Aspenleiter | Oct. 28, 1952 |

OTHER REFERENCES

"Motor Boat," page 25, September 1952.